Figure 1:
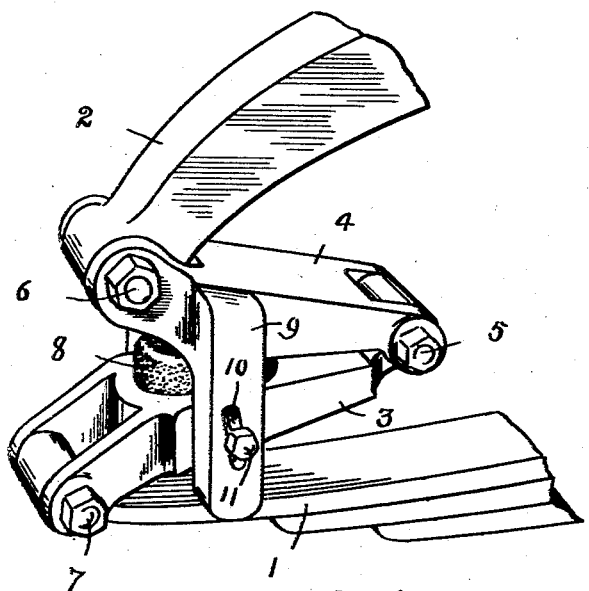

Mar. 3, 1925.

A. J. HERSEY

CUSHION SHACKLE

Filed March 12, 1923

1,528,481

Inventor

Arthur J. Hersey

Attorney

Patented Mar. 3, 1925.

1,528,481

UNITED STATES PATENT OFFICE.

ARTHUR JACKSON HERSEY, OF MINNEAPOLIS, MINNESOTA, ASSIGNOR OF ONE-FOURTH TO JOSEPH TRINKO, OF MENOMONIE, WISCONSIN, ONE-EIGHTH TO PAUL W. TIBBETTS, OF WAYZATA, MINNESOTA, ONE-EIGHTH TO THOMAS B. COOKERLY, JR., OF MINNEAPOLIS, MINNESOTA, AND ONE-EIGHTH TO EMERY NELSON, OF WAYZATA, MINNESOTA.

CUSHION SHACKLE.

Application filed March 12, 1923. Serial No. 624,671.

*To all whom it may concern:*

Be it known that I, ARTHUR JACKSON HERSEY, a citizen of the United States, residing at Minneapolis, in the county of Hennepin and State of Minnesota, have invented certain new and useful Improvements in Cushion Shackles, of which the following is a specification, reference being had therein to the accompanying drawing.

This invention relates to shock absorbing devices and has special reference to a novel form of connection between the end of the vehicle spring and the body thereof, and may be properly referred to as a cushion shackle, as it performs the double office of a shock absorber and shackle.

The principal object is to provide a more practical and efficient device of this character than heretofore known.

Another object is to provide a shock absorber which effects the general appearance of the spring and vehicle connection as little as possible.

Another object is to provide an efficient form of shock absorber that may be used upon either trucks or lighter classes of vehicles with equal good results, and one that cannot in any way be damaged or rendered inefficient by overloading, such as is experienced in truck use.

Other objects and advantages of the invention will appear in the further description thereof.

In the accompanying drawing forming part of this application and illustrative of one embodiment of the invention like reference characters indicate like parts.

Figure 2:
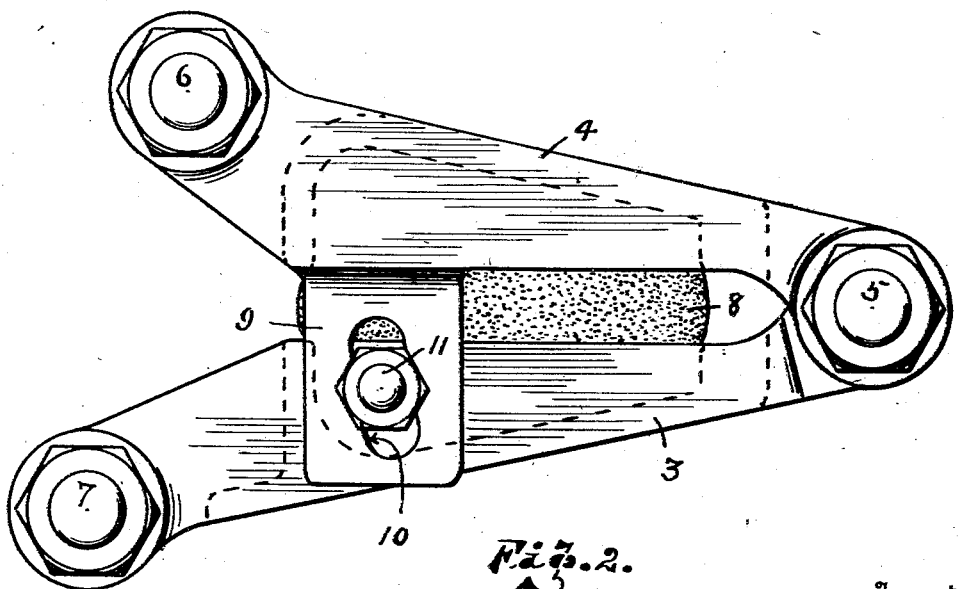

Figure 1 is a perspective view of the cushion shackle showing the cooperative relation intermediate the end of the spring and the end of the vehicle body frame; and Figure 2 is an enlarged side elevation of the shackle.

1 represents the end of an ordinary vehicle spring, while 2 is the end of the body frame of the vehicle, they being usually united by means of a shackle connection. My invention resides in the two-part jack-knife shackle comprising the members 3 and 4 which are pivotally united as at 5, forming the knee of the shackle, the opposite end of the member 4 being pivotally attached to the end of the frame 2 as at 6, and the opposite end of the member 3 pivotally united to the end of the spring 1, as at 7.

Intermediate of the shackle members 3 and 4 is installed a suitable rubber cushion 8, which may be of any form desired, either circular or rectangular, and as shown in Figure 2 of the drawing, the inner body portions of the shackle members are cupped out or recessed forming suitable opposed pockets in which the rubber cushion is installed; or it may be normally installed in the lower member only if preferred. This rubber cushion is obviously of sufficient thickness and consistency to counteract the normal stress thereupon without the members 3 and 4 engaging each other so that the weight of the body of the vehicle is virtually supported upon rubber; the knee joint 5 performing only the office of retainer.

The upper member 4 of the shackle is provided with depending arms 9 upon the sides thereof adjacent the outer ends, and these arms extend downwardly upon either side of the lower member 3, acting as a guide for same, and in fact the arms may be of sufficient length to project slightly below the end of the spring 1 that it may act as a guiding member in the event of a leaf of the spring breaking, or other accident happening. Through each of these arms is formed an arcuately disposed elongated slot 10, through which protrude the bolts 11 securely fixed within the side walls of the lower member 3, and the relation of the ends of the slot 10 to the bolts 11 is such as to limit the vertical action of the members 3 and 4 in both directions.

In the event of the shackle being installed upon a truck and it becoming heavily or over-loaded, the two parts 3 and 4 of the shackle may be squeezed together to such a degree that the upper member will rest upon the bolts 11, but resulting in no damage of the joint whatever, nor lessening the efficiency of the spring connection with the body of the vehicle. Instead of the upper member resting upon the bolts 11 it is apparent that a projection or stop may be accomplished in other ways between the two members of the shackle. Also if the rubber 8 is made with an annular concaved waist it may be squeezed together without pinching the circumferential edge thereof and the two faces of the end of the shackle abut each other.

From the foregoing it is evident that I have produced an exceptionally neat and efficient cushion shackle which may be installed intermediate of the end of a spring and an object to be supported, the same having the added advantage of neatness of appearance due to the fact that it is mounted inwardly of the end of the spring resulting in no projections whatever beyond the termination thereof.

Having thus described my invention, what I claim and desire to secure by Letters Patent, is:

1. A spring cushion shackle of the character described comprising two pivotally united supporting members, a rubber cushion housed intermediate of the body portions of said members and in constant engagement therewith, and means for limiting the relative action of the members.

2. A spring cushion shackle of the character described comprising two pivotally united supporting members, a rubber cushion intermediate of the body portions of said members and the extreme opposite ends thereof said cushion being equally housed within the body portions of the members.

3. A shackle of the character described comprising two normally spaced members hingedly united at one end, arms depending from the uppermost member upon either side of the lowermost member, means for retaining the lowermost member intermediate of said arms, and a rubber cushion intermediate of the members and in constant engagement therewith.

In testimony whereof I hereunto affix my signature.

ARTHUR JACKSON HERSEY.